United States Patent
Zach et al.

(10) Patent No.: US 10,355,440 B2
(45) Date of Patent: Jul. 16, 2019

(54) METHOD AND APPARATUS FOR THE SYNTHESIS OF ELECTROMAGNETIC RADIATION

(71) Applicant: Toptica Photonics AG, Grafelfing (DE)

(72) Inventors: Armin Zach, Windach (DE); Thomas A. Puppe, Munich (DE); Thomas Hellerer, Munich (DE)

(73) Assignee: TOPTICA PHOTONICS AG, Gräfelfing (DE)

( * ) Notice: Subject to any disclaimer, the term of this patent is extended or adjusted under 35 U.S.C. 154(b) by 247 days.

(21) Appl. No.: 14/649,284

(22) PCT Filed: Dec. 4, 2013

(86) PCT No.: PCT/EP2013/075493
§ 371 (c)(1),
(2) Date: Jun. 3, 2015

(87) PCT Pub. No.: WO2014/086834
PCT Pub. Date: Jun. 12, 2014

(65) Prior Publication Data
US 2015/0303639 A1    Oct. 22, 2015

(30) Foreign Application Priority Data

Dec. 4, 2012   (DE) .................. 10 2012 023 605

(51) Int. Cl.
*H01S 3/00*       (2006.01)
*G02F 1/01*       (2006.01)
(Continued)

(52) U.S. Cl.
CPC ............. *H01S 3/0085* (2013.01); *G01J 3/10* (2013.01); *G02F 1/01* (2013.01); *H01S 3/1307* (2013.01); *G01J 3/433* (2013.01); *H01S 3/0078* (2013.01)

(58) Field of Classification Search
CPC ................................ H01S 3/0085; G02F 1/01
(Continued)

(56) References Cited

U.S. PATENT DOCUMENTS

2008/0089698 A1    4/2008  Jiang

FOREIGN PATENT DOCUMENTS

| DE | 102010022585 A1 | 12/2011 |
| WO | 2012/085467 A1  | 6/2012  |
| WO | 2014/086834 A1  | 6/2014  |

OTHER PUBLICATIONS

Caraquitena J. et al, "Dynamic Spectral Line-by-line Pulse Shaping by Frequency Comb Shifting", Optics Letters, Optical Society of America, US, vol. 34, No. 13, Jul. 1, 2009, pp. 2084-2086.
(Continued)

*Primary Examiner* — Jack Dinh
(74) *Attorney, Agent, or Firm* — Raymond R. Ferrera; Adams and Reese LLP

(57) ABSTRACT

The invention relates to a method for the synthesis of electromagnetic radiation, wherein electromagnetic radiation having a spectrum comprising two or more spectral components is generated and phase setting of the electromagnetic radiation is performed. The invention proposes that the phase setting comprises phase shifting of the spectral components of the electromagnetic radiation, wherein the relative phase relationship of the spectral components is predeterminable. In addition, the invention relates to an apparatus for the synthesis of electromagnetic radiation, said apparatus comprising a pulsed laser (1), which generates a sequence of temporally equidistant light pulses, wherein the spectrum of the electromagnetic radiation of the pulsed laser (1) is the spectrum of an optical frequency comb, which is characterized by an offset frequency and a repetition rate. Furthermore, the apparatus has a phase setter (5), which effects phase setting of the electromagnetic radiation of the pulses laser (1). In accordance with the invention, the offset frequency of the spectral lines of the optical frequency comb is adjustable by time-proportional phase setting by means of the phase setter (5).

9 Claims, 3 Drawing Sheets

Figure 1:
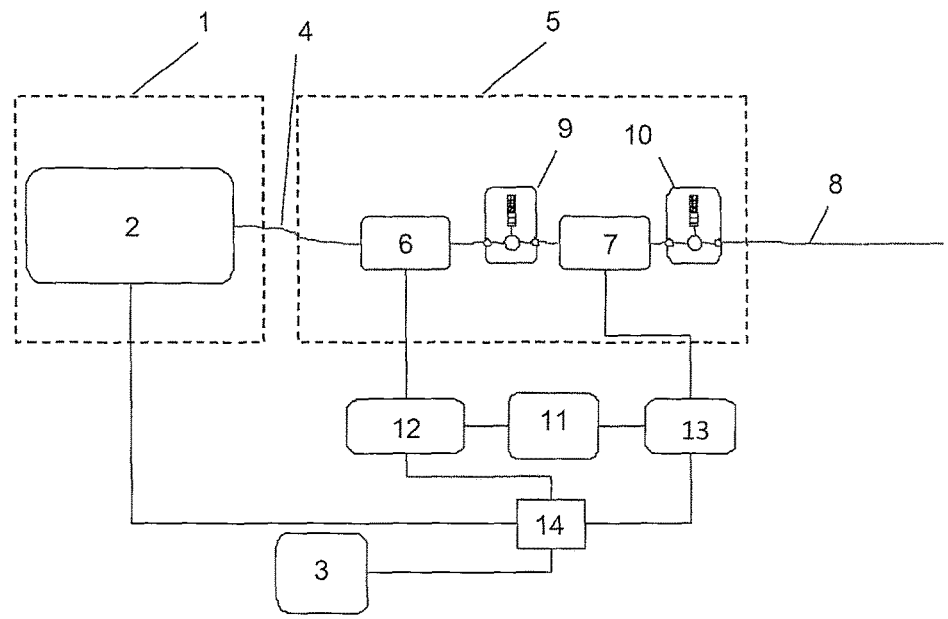

(51) Int. Cl.
    *H01S 3/13* (2006.01)
    *G01J 3/10* (2006.01)
    *G01J 3/433* (2006.01)

(58) Field of Classification Search
    USPC .......................................................... 359/259
    See application file for complete search history.

(56) References Cited

OTHER PUBLICATIONS

Santiago Tainta et al, "Experimental Demonstration of a FBG-based Temporal Optical Pulse Shaping Scheme Dual to Spatial Arrangements for its Use in OCDMA Systems", Asia Communications and Photonics Conference and Exhibition, Nov. 2, 2009, pp. 76320P-1-76320P-6.

Caraquitena J. et al., "Tunable Pulse Repetition-rate Multiplication Using Phase-only Line-by-line Pulse Shaping", Optics Letters, Optical Society of America, US, vol. 32, No. 6, Mar. 15, 2007, pp. 716-718.

International Search Report of the International Searching Authority issued in the corresponding PCT International Application No. PCT/EP2013/075493, dated Mar. 27, 2014, 7 pages.

Written Opinion of the International Searching Authority issued in the corresponding PCT International Application No. PCT/EP2013/075493, dated Mar. 27, 2014, 15 pages.

International Preliminary Report on Patentability Chapter I issued in the corresponding PCT International Application No. PCT/EP2013/075493, dated Jun. 9, 2015, 17 pages.

METHOD AND APPARATUS FOR THE SYNTHESIS OF ELECTROMAGNETIC RADIATION

The invention relates to a method for synthesis of electromagnetic radiation, said method comprising the steps of:
generating electromagnetic radiation, the spectrum of which comprises a plurality of spectral components,
phase setting of the electromagnetic radiation.

In addition, the invention relates to an apparatus for synthesis of electromagnetic radiation, said apparatus comprising:
a source of light, which generates electromagnetic radiation, the spectrum of which comprises a plurality of spectral components,
a phase setter, which effects phase setting of the electromagnetic radiation of the source of light.

A sequence of short light pulses can be generated by means of a mode-locked laser. Accordingly, a plurality of natural oscillations with different frequencies is induced in the resonator of the laser. These natural oscillations are also designated as modes. Each mode represents a spectral component in the spectrum of the electromagnetic radiation generated. By way of suitable mechanisms, a fixed phase relationship can be established between the modes. This is also designated as mode synchronization or mode locking. On account of the mode locking, radiation of light pulses occurs at a temporal distance which corresponds to a round trip time of a laser pulse in the laser resonator. From the temporal equidistance of the light pulses, it directly results that the spectrum of the electromagnetic radiation has equidistant spectral lines. Such a spectrum is also designated as optical frequency comb. The optical frequency comb is characterized by the repetition rate, i.e. the inverse value of the round trip time of the light pulses in the resonator, and by an offset frequency. The offset frequency is also designated as CEO frequency (Carrier-Envelope-Offset). The frequencies of the individual spectral lines of the optical frequency comb are non-integral multiples of the repetition rate. For the frequency $f_i$ of the spectral line with the index i of the frequency comb, it applies $f_i = f_{CEO} + i\Delta f$, wherein $f_{CEO}$ is the said offset frequency. $\Delta f$ is the distance of the spectral lines in the frequency comb, i.e. the repetition rate. The offset frequency results from the fact that the group velocity of the light pulses differs from the phase velocity of the superimposing modes in the resonator of the laser. The magnitude of the offset frequency depends on ambient influences, e.g. temperature, but also on the pumping efficiency of the laser, etc. In result, the offset frequency is temporally not stable.

Known from prior art in technology are various techniques for determining the offset frequency and for stabilizing it by appropriate controlling. For example, DE 199 11 103 A1 describes a method and a device for generating light pulses as well as their application to synthesis of optical frequencies. With the prior art approach, each mode is subjected to a spectrally specific frequency modification by introducing a predetermined linear dispersion into the resonator of the laser. On this basis, a control of the simultaneous adjustment of the dispersion and resonator length is proposed, by means of which the group and phase velocity can be controlled. The adjustment of dispersion, for example, is accomplished by inserting a linearly dispersive element, (e.g. a glass wedge) into the beam path of the resonator. Alternatively, the resonator may have a slewable end mirror. A disadvantage of these measures is that each modification of the dispersion is inevitably associated with a modification of the optical path length in the resonator, i.e. with a modification of the resonator round trip time and thus with a modification of the line distance of the spectral lines of the frequency comb. Ths necessitates a second control, for example a control of the resonator length. Thus, with the prior art method and/or prior art device, there are at least two control loops influencing each other in order to stabilize the offset frequency on the one hand and the repetition rate on the other hand. A particular disadvantage with the prior art approach is that on account of the required mechanical movements of components in the resonator of the laser, the achievable control bandwidths are limited to a few kHz. Though a faster control can be achieved with the prior art method and/or prior art device by varying the pumping efficiency of the laser, but the peak performance rate of the light pulses is thereby influenced, which may entail corresponding non-desired amplitude oscillations and non-desired non-linear effects.

Known from WO 2010/063051 A1 are a method and a device for generating a self-referenced optical frequency comb, wherein an acousto-optical modulator arranged outside the laser resonator allows for a frequency shifting of all spectral lines of the frequency comb.

Stabilizing the frequency comb is effected on this basis. This prior art approach has a disadvantage in that controlling the offset frequency by the acousto-optical modulator arranged outside the resonator is possible only with a small controlling range o+/−1 MHz. If the offset frequency drifts by more than 1 MHz, an additional slow control element in the resonator is again needed.

Against this background, it is the object of the present invention to provide an improved method and/or an improved device for synthesis of electromagnetic radiation.

The present invention achieves this object with a method of the initially described species in such a manner that the phase setting comprises a phase shifting of at least some of the spectral components of the electromagnetic radiation, wherein the relative phase relationship of these spectral components shows a predeterminable, preferably steady course.

In accordance with the present invention, the phase of at least one spectral component of the electromagnetic radiation (e.g. with a working frequency) can be shifted, this phase shifting taking effect on further spectral components in a defined and predeterminable manner. In particular, the frequency dependence of the phase shifting does not depend on a firmly predetermined dispersion course of a single dispersive element utilized for phase shifting (e.g. an electro-optical modulator), but—depending on a given case of application—it may differ from it. This results in flexibilty which is advantageous for numerous applications in the synthesis of electromagnetic radiation. On the other hand, an absolutely free predeterminability of the relative phase relationship is not required in the sense of the present invention. Predeterminability of the relative phase relationship in the sense of the present invention, in other words, means that phase shifting is effected frequency-selectively in a manner adapted to the relevant application.

Predeterminable is the relative phase relationship in the sense of the present invention in particular, if the phase setting causes a phase shifting of at least some of the spectral components of the electromagnetic radiation, wherein the relative phase relationship of the spectral components concerned remains mainly unchanged. An aspect of the present invention, for example, is carrying-out a phase setting of the electgromagnetic radiation generated by means of a pulse laser, wherein the phase setting is effected in such a manner that all spectral lines (or a group of spectral lines) of the frequency comb experience the same phase shifting, i.e. a frequency-independent phase shifting.

The inventive method makes it possible to set the frequency of at least one of the spectral components by a time-proportional phase setting. In particular, the frequency can be controlled, with phase setting being effected depending on a control variable. Accordingly, the control variable is expediently derived by means of a controller from the phase-set electromagnetic radiation. In this manner, a closed control loop is formed which is utilizable for generating electromagnetic radiation that is controlled, i.e. stabilized, in terms of frequency.

With an optical frequency comb, the offset frequency can be adjusted inventively by way of a time-proportional phase shifting, maintaining the repetition rate mainly constant at the same time. To adjust the offset frequency it is advantageous that phase shifting, with a corresponding light pulse train, can be effected modulo a multiple of 2π, while the phase setback can be effected without influencing the optical phases in the dark, i.e. during pulse pauses.

The inventive approach advantageously enables generating a stabilized frequency comb by controlling the offset frequency, wherein the (time-proportional) phase shifting is the control variable. For this purpose, the control variable can be established e.g. in an actually known manner by means of f-2f-interferometry from the phase-set electromagnetic radiation, i.e. by way of an f-2f-interferometer at the output of the phase setter. In f-2f-interferometry, part of the electromagnetic radiation at the output of the phase setter is conducted into an interferometer in which a non-linear optical process is utilized to generate the second harmonic of a low-frequency spectral line of the frequency comb and to bring it to interference with a high-frequency line of the frequency comb. In this manner, a beat signal can be generated whose frequency is equivalent to the offset frequency. The offset frequency lies in the radio frequency range. Controlling the offset frequency can then be done, for example, by way of a conventional phase control loop, utilizing a suitable reference signal.

As compared with the approach disclosed in DE 199 11 103 A1, the inventive solution has a disadvantage in that phase setting can be effected completely outside the optical resonator of a pulse laser utilized for generating the electromagnetic radiation. Hence, an interfering intervention into the resonator is not necessary. As compared with the solution described in WO 2010/063051 A1, it yields the advantage of the possibility of a substantially greater hub in phase and/or frequency setting.

In a preferred embodiment of the inventive method, phase setting is effected by means of a phase setter which comprises at least two phase actuators which in the beam trayectory of the electromagnetic radiation are arranged one behind the other and which have different dispersion. For example, the electromagnetic radiation initially passes through a first phase actuator. This causes a phase shifting. However, dispersion of the first phase actuator takes the effect that the generated phase shifting is frequency-dependent. It means that each of the relevant spectral lines of the frequency comb experiences a different phase shifting that cannot be influenced. This can be avoided according to the present invention. For example, to achieve that the relative phase relationship of the spectral components remains unchanged, if possible, in phase setting in accordance with the present invention, the electromagnetic radiation, having passed the first phase actuator, passes through a second phase actuator which is so designed that the total dispersion of both phase actuators is compensated. Having passed through the two phase actuators, the relevant spectral components thus have experienced the same phase shifting. In other words, phase shifting is frequency-independent. The sequence of the two phase actuators in the beam trayectory is of no significance. For example, if a time-proportional and frequency-independent phase setting is effected in the aforementioned manner, the offset frequency of the frequency comb can thereby be adjusted advantageously without any change occurring in the repetition rate. If required, however, it is also possible by way of a suitable frequency-selective phase setting to set or to control the repetition rate. For example, the repetition rate can be controlled by means of an appropriate controller subject to a control deviation derived from the repetition rate of the phase-set electromagnetic radiation and a reference signal.

On the whole, the present invention thus enables generating an optical frequency comb which is stablized in terms of offset frequency and repetition rate. This requires two control loops which work according to the principle described above.

In a preferred embodiment, phase setting comprises a temporal and/or spatial splitting of the spectral components of electromagnetic radiation. Then, at least in one phase actuator, electromagnetic radiation can pass through a medium with a temporally and/or spatially variable diffraction index. The temporal and/or spatial splitting of spectral components makes it possible to effect a phase setting by means of the relevant phase actuator in a spectrally selective manner, for example by utilizing a medium in the phase actuator that has an appropriate temporally and/or spatially selective diffraction index. Here it matters that the temporally or spatially separated spectral components each experience a predetermined phase shifting. For example, the temporal and/or spatial diffraction index trayectory of the relevant phase actuator can be harmonized to the temporal and/or spatial splitting of the spectral components of electromagnetic radiation in such a manner that the overall dispersion, i.e. the frequency-dependent phase shifting which is generated by the phase actuators (including the material dispersion of phase actuators) is compensated in this actuator. For example, a chirp can be embossed on the light pulses by way of a suitable dispersive element (optical extensor, fiber-Bragg-grating, etc.). It means that the individual spectral components are temporally stretched out. In the second phase actuator, the low-frequency spectral components, for example, arrive earlier than the high-frequency spectral components of the electromagnetic radiation. A suitable temporal variation of phase shifting on one of the phase actuators can then be utilized to offset the frequency dependence of the generated phase shifting, so that in result, all spectral components of the electromagnetic radiation experience the same phase shifting. This means that the phase shifting is changed in the relevant phase actuator, for example via a temporal variation of the diffraction index while a light pulse passes through this phase actuator. With a spatial splitting of the spectral components of electromagnetic radiation, frequency-selective phase shifting, for example, can be effected by a phase actuator that comprises a medium with a suitable spatial diffraction index trayectory or with a suitable geometry (e.g. wedge or prism shape), so that each spectral component experiences the desired phase shifting when it passes throug the medium in the spatial range of the medium provided for this component.

Two separate phase actuators are not necessarily required for practical implementation of the present invention. A single element, e.g. an electro-optical modulator, if appropriately activated, can take charge of the function of both phase actuators and in result it can effect the desired frequency-selective and/or frequency-independent phase shifting.

The effected spatial and/or temporal splitting of the spectral components can be abolished, i.e. be reversed, wholly or partly again after having passed through the phase actuators, e.g. by compression by means of suitable dispersive elements.

The concept of frequency-selective phase setting by temporal splitting of light pulses as described above is actually known from DE 10 2011 012 749 A1 in conjunction with generating optical frequency combs. There, however, this concept is not utilized in the sense of the present invention for controlling the offset frequency and in result for achieving a frequency-independent phase setting, but for reducing high-frequency timing jitter of a light pulse train.

Figure 2:
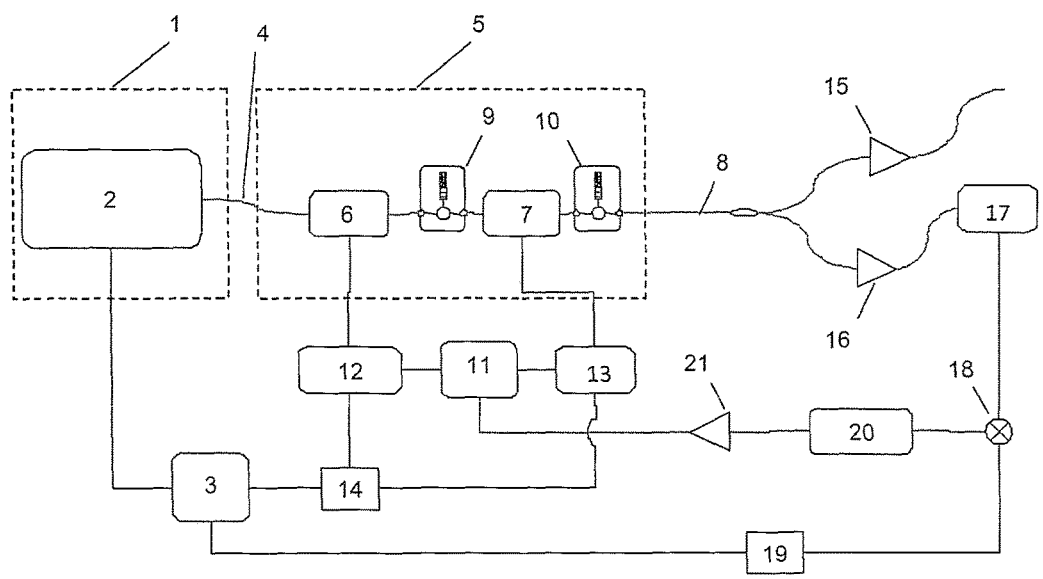
Figure 3:
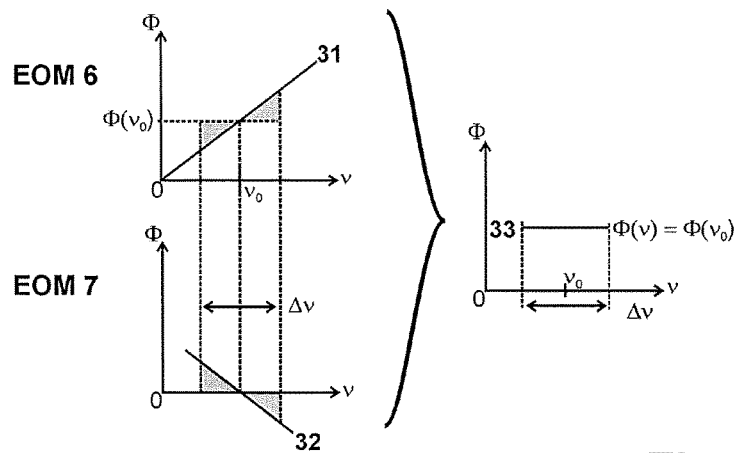
Figure 4:
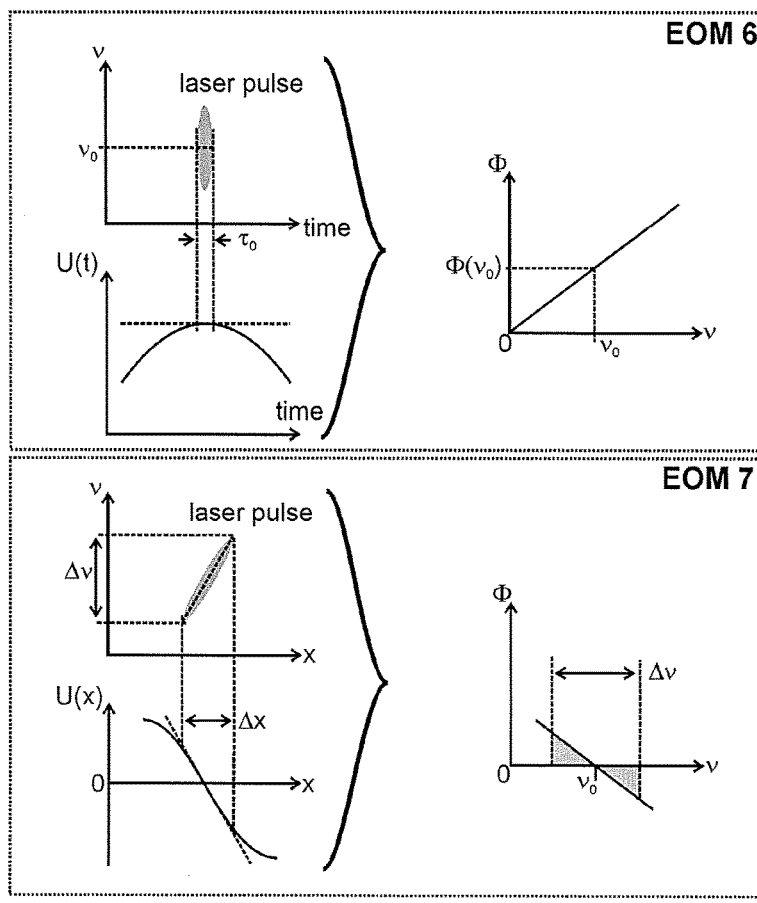
Figure 5:
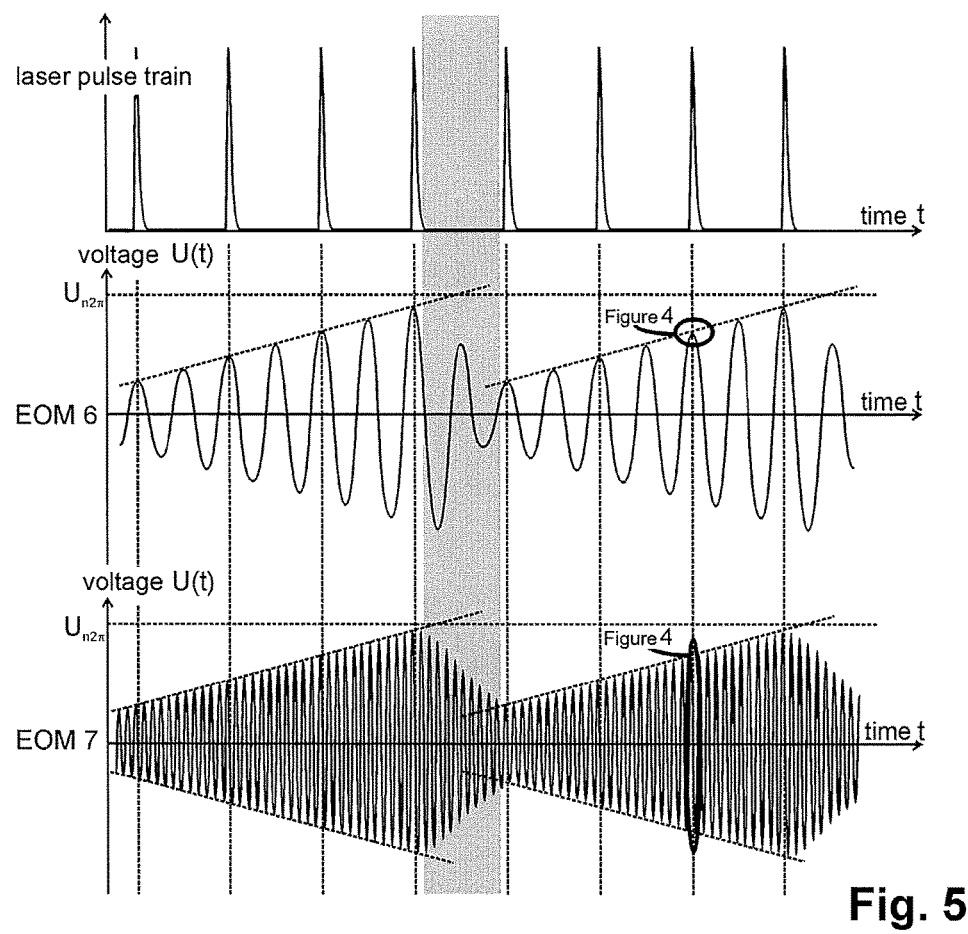

Practical examples of the present invention are described in greater detail by way of the following drawings, where:

FIG. 1: shows a first practical example of an inventive device as a block-type diagram;

FIG. 2: shows a second practical example of an inventive device as a block-type diagram;

FIG. 3: illustrates the principle of dispersion compensation by two phase actuators;

FIG. 4: illustrates the frequency-selective phase setting according to the invention;

FIG. 5: illustrates the activation of electro-optical modulators utilized in practical examples according to FIGS. 1 and 2.

The device shown in FIG. 1 comprises a pulse laser 1 which generates a sequence of temporally equidistant light pulses. The spectrum of the pulse laser 1 is the spectrum of an optical frequency comb which is characterized by an offset frequency and a repetition rate in the manner described above. The pulse laser 1 comprises a mode-locked laser, for example an erbium fiber laser 2 which in terms of the repetition rate is stabilized in an actually known manner. Serving as reference for stabilizing the repetition rate is a reference signal source 3 which generates a reference signal in a radio frequency range, for example with a frequency of 10 MHz. If required, the reference signal can also be derived from the pulse train of pulse laser 1. The light pulse train generated by the pulse laser is passed via an optical fiber 4 to a phase setter 5, which effects a phase setting of the electromagnetic radiation of pulse laser 1. By means of phase setter 5, the offset frequency of the spectral lines of the optical frequency comb is adjusted by time-proportional phase setting, with the repetition rate remaining constant. To this end, the phase setter 5 comprises two phase actuators 6 and 7, which are arranged one behind the other in the beam trayectory of the electromagnetic radiation. Radiation initially passes through the first phase actuator 6 and then through the second phase actuator 7. Both phase actuators 6 and 7 are so designed and harmonized to each other that the second phase actuator 7 compensates the overall dispersion of the two phase actuators 6,7 so that the electromagnetic radiation at the output 8 of phase setter 5 has a frequency-independent phase shifting. It means that all relevant spectral lines of the frequency comb are phase-shifted by the same amount, the relative phase relationship of spectral lines remaining unchanged. The two phase actuators 6 and 7 are electro-optical modulators (EOM) which have a phase shifting that depends on the relevant voltage of an input signal of the EOMs 6 and 7 and which is thus controllable and temporally variable. EOM 6 causes a phase shifting according to a control signal present at a distinct point of time. On account of the dispersion of EOM 6, this phase shifting is frequency-dependent. It means that the various spectral components of the optical frequency comb each experience a different phase shifting. This frequency dependence of the phase shifting is compensated by the second EOM 7. To allow this to happen, the second EOM 7 is preceded in the beam trayectory by a splitting element 9 which in this practical example causes a temporal splitting of the spectral components of the electromagnetic radiation. In other words, the splitting element 9 embosses a chirp on the electromagnetic radiation, so that the different spectral components are temporally stretched. Suitable for use as splitting element 9 is a temporally dispersive element of an actually known species, such as for example an optical extensor, a fiber-Bragg-grating, or the like. Also conceivable would be a spatial splitting of the spectral components of the electromagnetic radiation. An appropriate prism arrangement, a spatial light modulator or a similar element could serve for this purpose. In the practical example shown here, a fiber-Bragg-grating, for example tied-in via a circulator, is utilized as temporally dispersive element. After the temporal splitting of the spectral components by means of splitting element 9, the various spectral components pass through the second EOM 7 in an accordingly temporally consecutive manner. For compensation of the frequency-dependent portion of phase setting caused by the first EOM 6, this is inventively exploited to cause an opposite frequency-dependent phase shifting in the second EOM 7. To this end, the second EOM 7 is activated in such a manner that its phase shifting changes during the time interval in which a light pulse passes through EOM 7. Thus it is achieved that the EOM 7, at the moment when a certain spectral component passes through EOM 7, has the dispersion that is needed in order to reverse the undesired frequency-dependent portion of phase shifting of the relevant spectral component. Located at the output of EOM 7 is a compensation element 10 which again reverses the temporal splitting of the spectral components of the electromagnetic radiation. In this practical example, it is again a fiber-Bragg-grating. It ensures that the various spectral components of the light pulse train are again brought temporally together. In other words, the splitting and compensantion elements 9, 10 cause a temporal broadening, i.e. stretching of the light pulses and/or a temporal shortening, i.e. compression of light pulses. Depending on the profile of requirements, the temporal stretching and compression can be effected by several orders of magnitudes of time.

A control electronics 11 which activates a serrodyne element 12 and a controllable attenuator 13 serves for setting the offset frequency of the optical frequency comb. The serrodyne element 12 at its input receives a signal from the control electronics 11 which for example is proportional to a desired shifting of a working frequency, i.e. a spectral component of the frequency comb. At the output, the serrodyne element 12 generates a time-dependent control voltage for activation of EOM 6. The serrodyne element 12 generates the control voltage in such a manner that in accordance with the desired shifting of the offset frequency, a time-proportional phase shifting modulo a multiple of $2\pi$ is effected by EOM 6. A shifting of the offset frequency of the frequency comb results from $\Delta \nu = \Delta f \times (\varphi_{i+1} - \varphi_i)/2\pi$, where $\Delta f$ is the repetition rate and $\varphi_i, \varphi_{i+1}$ are the generated phase shiftings of two consecutive light pulses with the indices i and/or i+1. The phase setback in the modulo $-2\pi$-phase shifting, i.e. resetting the amplitude of voltage U(t) upon reaching the value $U_{n2\pi}$, is effected during the dark phase between two light pulses. This is indicatively shown by the dark shaded area in FIG. 5. The reset procedure has no corresponding effect on the optical phases.

The time course of control voltage U(t) of EOM 6 is illustrated in the medium diagram of FIG. 5. The vertical dashed lines represent the points of time at which the consecutive light pulses pass through EOM 6. The amplitude-modulated sinusoidal oscillation reflects the course of control voltage of EOM 6. It can be seen that the control voltage grows linearly each at the moment of consecutive light pulses. This causes a time-proportionally growing phase shifting, elucidated in the bottom diagram of FIG. 5, where the phase shifting values Φ(1), Φ(2), Φ(3), Φ(4) are entered as horizontal bars. This time-proportional phase setting causes a corresponding shifting of the working frequency. As can be seen in the medium diagram of FIG. 5, the voltage U(t) oscillates synchronously to the repetition rate (and/or to a multiple of the repetition rate) of the light pulse train. The course of the voltage U(t) during the pauses between the light pulses takes no effect. It just matters that the right momentary voltage value is present at the point of time when a light pulse passes through EOM 6. For this approximation, the duration $\tau_0$ of light pulses must be significantly shorter than the pause between the light pulses, which is the case with light pulse trains of usual short pulse lasers. This circumstance is illustrated in the upper part of FIG. 4. The pulse duration lies in a range of femtoseconds to picoseconds, while the repetition rate ranges between 10 and 100 MHz. As a control signal, the second EOM 7 receives a radio frequency signal which is derived via a frequency multiplier/splitter 14 from the signal of the reference signal source 3. The frequency-multiplied radio frequency signal is amplitude-modulated by means of the controllable attenuator 13. The lower diagram of FIG. 5 shows the control voltage U(t) which is present at the second EOM 7. On account of the increased frequency of the control voltage U(t) at the moment of the arrival of the light pulses (dashed vertical lines), the signal U(t) is characterized by a high flank steepness. As one can see in the lower diagram of FIG. 5, the amplitude of the voltage U(t) varies from light pulse to light pulse. This means that with the consecutively arriving light pulses, one voltage flank each with different steepness is active. The steep flanks ensure that the phase shifting in EOM 7 changes, while the relevant (temporally stretched) light pulse passes through EOM 7. This circumstance is illustrated in the lower part of FIG. 4. This is accomplished in such a manner that the non-desired frequency-dependent portion of the phase shifting caused by EOM 6, as has been outlined above, is compensated. This is illustrated in FIG. 3. Thus, for the inventive frequency-selective and/or frequency-independent phase setting, what matters is the amplitude of the control voltage U(t) of EOM 6 at the moment of a light pulse and the increase (amplitude) of the control voltage U(t) of EOM 7 at the moment of the light pulse.

The inventive principle for phase setting is explained in more detail in the following by way of the diagrams in FIGS. 3 and 4:

FIG. 3 illustrates the phase shifting by means of EOM 6 and the compensation of frequency dependence of the phase shifting by means of EOM 7. Shown in the diagram is a spectral portion of the frequency comb with a spectral bandwidth Δv about one working frequency $v_0$. Disregarding material dispersion, the first EOM 6 causes a frequency-proportional phase shifting φ(v) which is reflected by the straight line 31. Now, EOM 7 is activated in the afore-mentioned manner in such a way that it causes a frequency-dependent phase shifting φ(v) with opposite gradient. The frequency-dependent phase shifting through the second EOM 7 is reflected by the straight line 32. In result, all spectral lines within the range Δv, as illustrated in the diagram of FIG. 3, experience a medium phase shifting φ($v_0$), which is independent of frequency v, corresponding to the straight line 33. By way of FIG. 3, it can be seen how the frequency trayectories of phase settings 31 and 32 are to be selected and harmonized to each other with regard to gradient and axis section so as to result in the desired frequency-independent phase shifting ($v_0$).

FIG. 3 illustrates the idealized case of a linear dispersion. With a significantly linear course of dispersion, the curves 31 and 32 should have a corresponding non-linear course in order to realize the frequency-independent phase shifting.

FIG. 4 illustrates the temporal and/or spatial splitting of the spectral components of electromagnetic radiation. The coordinate x in the diagrams in the lower part of FIG. 4 represents the location (with a spatial splitting) for the time (with a temporal splitting). On passing through the first EOM 6, the spectral components of electromagnetic radiation in this practical example are not split-up. With the practical example of FIG. 1, it means that a light pulse passes through EOM 6 simultaneously with all spectral components. A temporal and/or spatial splitting of the spectral components is generated by way of splitting element 9. This is illustrated in the bottom section of FIG. 4. It can be seen that a time and/or location interval Δx is allocated to the spectral range Δv. With the practical example shown in FIG. 1, this means that the different spectral components of the light pulse, as has been outlined above, pass through EOM 7 at different points of time. The dispersion curve 32 according to FIG. 3 is produced by a corresponding temporal activation of the second EOM 7 as illustrated in the lower diagram of FIGS. 4 and 5.

Suitable for the invention are, for example, EOMs made of lithium niobate which are commercially available. These are suitable for light pulses with a carrier wavelength of 1550 nm. To generate the frequency-dependent phase shifting according to FIG. 3, the light pulses can be "chirped", e.g. by means of the splitting element, to a pulse duration of 1 ps. To achieve the required temporal course of the dispersion in EOM 7, while the chirped light pulse passes through it, the EOM 7 can be activated, for example, with a voltage in a range of <1 V at a frequency in a range of 10 GHz.

The practical example shown in FIG. 2 illustrates how a stabilized and self-referenced optical frequency comb is generated in accordance with the present invention. The device illustrated corresponds to the device illustrated in FIG. 1 inasmuch as the same reference numbers are used. At the output of phase setter 5, the electromagnetic radiation is split-up to two waveguides. Amplification by means of optical amplifiers 15 and 16 occurs in each branch. At the output of amplifier 15, the generated effective radiation is utilizable. The radiation emitted at the output of amplifier 16 is conducted to an f-2f-interferometer 17. A radio frequency signal whose frequency is equivalent to the offset frequency is present at the output of the f-2f-interferometer 17. This signal is demodulated in a mixer 18 with a high-frequency signal which is derived from the output signal of the reference signal source 3 via a frequency multiplier/splitter 19. The modulation signal thus produced is present at the input of a frequency-to-voltage converter 20. Its output signal is amplified by means of an amplifier 21 and it serves as input signal for the serrodyne element 12 and the voltage-controlled attenuator 13. The control loop 13 generated according to FIG. 2 causes a self-referenced control of the offset frequency to a value that is determined by the frequency of the radio frequency signal at the output of the frequency multiplier/splitter 19. If adjustment of the offset frequency is desired, then, for example, the output voltage at the frequency-to-voltage converter 20 can be shifted by an appropriate value. This can be accomplished by means of a simple voltage adder.

If requested, a shifting of the spectral lines relative to the working frequency $v_0$ can be achieved by modifying the time-progressive gradient of the voltage curve U(t) at EOM 7 (not shown here). Thereby, it is also possible to set or control the relative frequency distance, i.e. the repetition rate.

In principle, it is possible to unite the functionalities of both EOMs 6 and 7 in a single EOM (not shown here), for example by generating a voltage offset by way of phase shifting of the control voltage U(t) according to the lower diagram of FIG. 5 in addition to the flank of the control voltage U(t) at the moment of the light pulse. Accordingly, the amplitude of the control voltage U(t) scanned by the central frequency of the temporally split light pulse determines the effective phase shifting.

The inventive principle of phase and frequency setting is not restricted to applications to optical frequency combs. The principle can also be utilized to synthesize electromagnetic radiation with spectrae deviating therefrom, in which no equidistant spectral lines appear. For example, the principle can also be applied to electromagnetic radiation which is generated by superimposition of the radiation from several cw-lasers at different frequencies.

The phase setter 5 with the EOMs 6 and 7, the splitting element 9, and the compensation element 10 can be executed through separate optical components or as a single integrated (fiber) optical element with waveguide structures and EOM crystals (chip solution).

The invention claimed is:

1. An apparatus for synthesis of electromagnetic radiation, said apparatus comprising:
   a source of light generating electromagnetic radiation, the spectrum of which comprises a plurality of spectral components, and
   a phase setter, which effects phase setting of the electromagnetic radiation of the source of light,
   wherein the phase of at least some of the spectral components of the electromagnetic radiation can be shifted by means of the phase setter, and wherein the phase setter comprises at least one splitter element which effects a temporal and/or spatial splitting of the spectral components of the electromagnetic radiation, wherein at least one phase setting actuator of the phase setter comprises a medium which effects a temporally and/or spatially variable phase shifting of the electromagnetic radiation.

2. The apparatus according to claim 1, wherein the source of light is a pulsed laser, which generates a sequence of temporally equidistant light pulses, wherein the spectrum of the electromagnetic radiation of the pulses laser is the spectrum of an optical frequency comb, which is characterized by an offset frequency and a repetition rate, wherein the offset frequency of the spectral lines of the optical frequency comb is adjustable by means of the phase setter by time-proportional phase setting, wherein the repetition rate essentially remains constant.

3. The apparatus according to claim 2, comprising a controller actuating the phase setter, said controller stabilizing the frequency of at least one of the spectral components of the optical frequency comb.

4. The apparatus according to claim 3, comprising an f-2f-interferometer arranged downstream of the phase setter, wherein the controller derives a controlling variable from the output signal of the f-2f-interferometers.

5. The apparatus according to claim 2, wherein the phase setter comprises at least two phase setting actuators which in the beam trajectory of the electromagnetic radiation are arranged one behind the other and which have a different dispersion.

6. The apparatus according to claim 5, wherein the phase actuators are electro-optical modulators.

7. The apparatus according to claim 1, wherein the phase setter comprises at least one compensating element which wholly or partly overrides a temporal and/or spatial splitting of the spectral components of the electromagnetic radiation.

8. The apparatus according to claim 1 wherein the splitting element and a compensation element each further comprise a spatially or temporally dispersive element.

9. The apparatus according to claim 1, wherein the phase setter is located wholly or partly outside the optical resonator of the pulsed laser.

* * * * *